United States Patent [19]

Moore

[11] Patent Number: 4,964,121
[45] Date of Patent: Oct. 16, 1990

[54] BATTERY SAVER FOR A TDM SYSTEM

[75] Inventor: Morris A. Moore, West Palm Beach, Fla.

[73] Assignee: Motorola, Inc., Schaumburg, Ill.

[21] Appl. No.: 400,419

[22] Filed: Aug. 30, 1989

[51] Int. Cl.$^5$ ............................................. H04B 1/16
[52] U.S. Cl. ................................ 370/100.1; 455/343; 340/825.44; 375/116
[58] Field of Search ............. 455/343; 370/100, 100.1; 340/825.44; 375/106–119

[56] References Cited

U.S. PATENT DOCUMENTS

| | | | |
|---|---|---|---|
| 3,769,593 | 10/1973 | Williams | 325/492 |
| 4,398,192 | 8/1983 | Moore et al. | 340/825.44 |
| 4,449,248 | 5/1984 | Leslie et al. | 455/38 |
| 4,479,261 | 10/1984 | Oda et al. | 455/343 |
| 4,509,199 | 4/1985 | Ichihara | 455/7 |
| 4,577,315 | 3/1986 | Otsuka | 370/95 |
| 4,652,875 | 3/1987 | Waki | 340/825.44 |
| 4,802,240 | 1/1989 | Yamaguchi et al. | 455/343 |

*Primary Examiner*—Douglas W. Olms
*Assistant Examiner*—Christopher O. Edwards
*Attorney, Agent, or Firm*—Robert S. Babayi

[57] ABSTRACT

A power saving method and apparatus in a time division multiplexed system (10) capable of providing a synchronous full duplex communication between a telephone network (12) and a plurality of remote communication units (18). A communication resource controller (14) provides system synchronization, by periodically trnsmitting synchronization messages through one or more remote sites (11). The communication units (18) attempt to acquire synchronization during a synchronization acquisition interval. If synchronization is acquired, the communication units (18) enter a synchronous battery saving mode (515). In the synchronous battery saving mode (515), the communication units (18) can detect a call request either to their own address or to the address of another communication unit. If no call request is detected, the communication units (18) reduce power consumption for a synchronous power saving time interval, and thereafter merely verify synchronization. However, if synchronization is not acquired, the communication units enter an asynchronous power saving mode (525), wherein they reduce power consumption for an asynchronous power saving interval. The communication units (18) may enter the asynchronous battery saving mode (505), if a call request to another communication unit is detected. The asynchronous power saving interval is substantially longer than synchronous power saving interval.

23 Claims, 5 Drawing Sheets

BATTERY SAVER FOR A TDM SYSTEM

TECHNICAL FIELD

This invention relates generally to the field of radio communication in a time division multiplexed communication system. The system having a plurality of remote communication units communicating with a central control station. In particular the invention relates to a method and apparatus for saving power consumption in the remote communication units.

BACKGROUND

The general problem of extending battery life of a remote communication unit has been recognized for a long time. This problem can be appreciated when considering that a remote communication unit, such as a portable radio or a pager, has a limited energy supply (i.e., a battery) for powering the communication unit. In the communication unit a receiver monitors a communication channel for receiving information and/or messages. If the receiver continuously monitors the channel, power consumption is increased, and the life of the energy supply is decreased.

Prior attempts in solving this problem have resulted in many and varied solutions. These attempted solutions have typically involved enabling and disabling a battery saving mean for periodic intervals such that the unit remains inactive (or "OFF") for most of the time, and becomes active (or "ON") at periodic short intervals to monitor a communication channel. Generally, during the OFF period, major portions of power consuming circuitry of the communication unit are inactivated leaving only a small timing circuit active. This timing circuit, at the end of a predetermined interval, activates the entire communication unit circuitry. If during the ON period an attempt to communicate with the unit, or a call, is discovered, the communication unit remains on for an extended period of time or until the call is terminated.

In a time division multiplexed (TDM) system the communication channel is divided into a predetermined number of time slots, wherein a remote communication unit may communicate with a central control station within an assigned time slot. For example, a radio may be assigned to a 100 ms time slot for transmission and reception of a message in a regularly reoccurring sequence of time slots. If so, the battery saving circuits of each individual radio may be designed so as to synchronously monitor centrally transmitted synchronization signals at their respective predetermined assigned time slots, but otherwise be in a substantially unenergized power saving mode of operation.

Some prior art circuits have also used an inverse control procedure where the receiver is turned "OFF" for predetermined intervals only if it is successfully receiving a specified digital synchronization pattern. Furthermore, there have been prior art attempts to divide the radios of a TDM system into predetermined groups that have special group addressing codes (e.g. tones, digital words, etc.). One such system is disclosed in U.S. Pat. No. 4,389,192 issued to the applicant of the instant application, which enhances the battery saving features by requiring identification of one of these predetermined group address signals before a given radio receiver or radio is removed from its standby battery saving mode of operation. Accordingly, when communication attempts are being made to a given radio, only the radios in that given group will be taken out of the battery saving mode of operation.

Some other prior art systems are asynchronous in operation. For example, all radios may have a regular sampling interval of 0.5 seconds and a group preamble tone (which precedes any attempt to communicate with one or more receivers of a given group), which is substantially longer than 0.5 second in duration. Accordingly, no matter when an attempt is made to communicate with a given group of stations after the initial preamble tone has ended, all radios of that given group will have been removed from their battery saving mode of operation, and energized so as to accept any communication addressed thereto or perhaps addressed generally to every radio of a given group.

Another approach for battery saving of remote radios is described in U.S. Pat. No. 4,449,248 issued to Leslie et al. Leslie et al. discloses a system wherein the duration of the ON/OFF ratio of a group of remote radios is programmed by by central station. In Leslie's system, the ON/OFF timing ratio is programmed into the communication unit, according to an information signal received from the control station. Accordingly, a programmable timer is programmed to activate and deactivate the power supply based on the received information signal. The communication with the radio occurs at intervals during which the corresponding group of radio's are active.

However, in a TDM system there is a need to provide a more effective power saving for the remote radios during situations where a substantially prolonged out-of-synchronization or lack of communication with the central control station is anticipated, such as when the remote radios are out of communication range with the central control station, when a call is in process between another unit and the central control station, and/or when the central control station is experiencing a malfunction.

SUMMARY OF THE INVENTION

Briefly, according to the invention, a TDM communication system is provided wherein a communication resource controller and a group of communication units, each having a predetermined address, communicate a message signal in a synchronous manner. The communication unit attempts to synchronize with the communication resource controller during a synchronization acquisition interval. When synchronization is not acquired, the communication unit enters an asynchronous power saving interval, wherein it reduces power consumption for an asynchronous power saving interval. When synchronization is acquired, the communication unit enters a synchronous battery saving mode, where it reduces power consumption for a synchronous power saving interval. After the synchronous power saving interval has elapsed, the communication unit verifies synchronization during a synchronization verification interval, and when verified the communication unit determines whether a call has been requested or not. The communication unit processes the call when directed to the address to which it responds. When the call is addressed to another communication unit, the communication unit enters a second asynchronous power saving interval.

DETAILED DESCRIPTION OF THE PREFERRED EMBODIMENT

Figure 1:
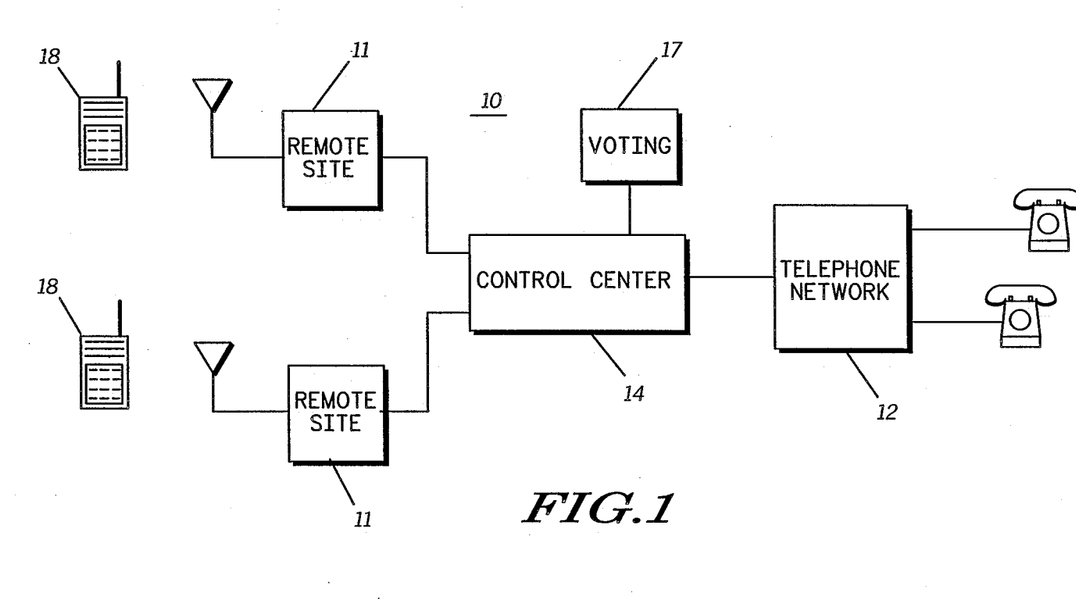
FIG. 1 is a block diagram of a TDM communication system, which utilizes the battery saving method and apparatus of the present invention.

Referring to FIG. 1, a time division multiplex communication system 10, which may advantageously utilize the power saving method of the invention is shown. In the preferred embodiment, the communication system 10 comprises a communication control center 14, one or more remote sites 11, which may be identical, and a plurality of remote communication units 18 each having an address. Accordingly, the control center 14 constitute a communication resource controller, and the remote sites 11 constitute the resources. A communication unit 18 communicates with the remote sites 11 on a single frequency radio frequency (RF) channel. As will be described in conjunction with FIG. 4, the RF channel is divided into transmit and receive time slots during which the communication between the communication unit 18 and the communication resource controller 14 is achieved. The system 10 is also known as a time division duplex (TDD) system.

The communication system 10 is capable of providing full duplex, voice or digital data, communication between a public or private telephone network and the communication unit 18. A call to a communication unit 18 is preferably initiated by a user on entering into the control center 14, via the telephone network 12, a dual tone multiple frequency (DTMF) code, which corresponds to the address of the desired communication unit 18. The communication resource controller 14 directs the call to the remote sites 11 for transmission to the addressed communication unit 18. Accordingly, a user of the communication unit 18 is capable of initiating a call through a key pad (shown and described in conjunction with FIG. 5), or transmitting a response after a call has been received. The call or response from the communication unit 18 is received by the remote sites 11, and is directed to the communication resource controller 14.

The number of remote sites 11 utilized within the system are determined by a number of factors, some of which are: the power by which the communication units 18 transmit messages, the message format, and the general coverage area to be encompassed by the system 10. When a plurality of remote sites are used, it is possible that one or more remote sites receive a message transmitted by the communication unit 18, therefore, it is desired to select the remote site providing the highest output level for the received message. A receiver voting means 17 provides a steering signal to the communication resource controller 14, which identifies the remote site providing the highest output level, and the communication resource controller 14 will continue the communication through the identified remote site 11. One such voting means is disclosed in U.S. Pat. No. 4,013,962 entitled "Improved Receiver Selecting (Voting) System" to Beseke et al., assigned to the assignee of the present invention, and which is incorporated herein by reference.

Figure 2:
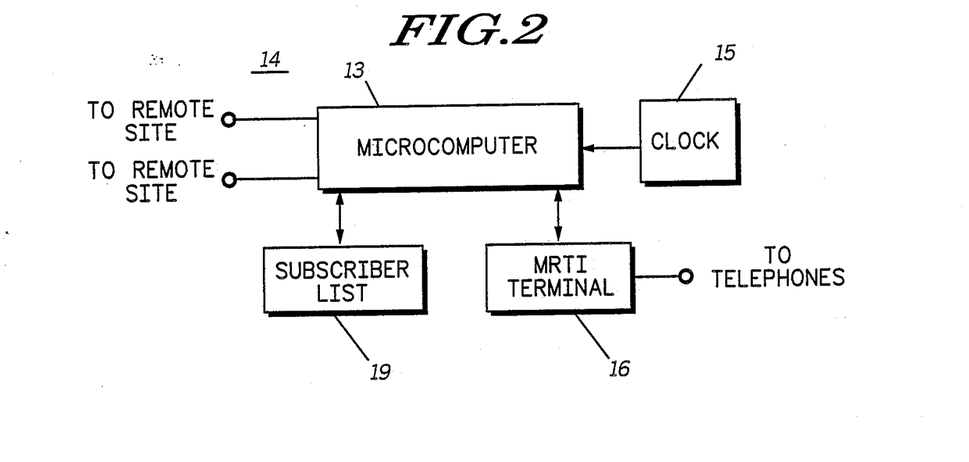
FIG. 2 is a block diagram of the communication resource controller of the communication system of FIG. 1.

Referring to FIG. 2, a block diagram of the communication resource controller 14 of FIG. 1 is shown. A microcomputer 13 controls the operation of the communication resource controller 14, and may comprise any known microcomputer system, such as ones used for the controlling of known paging terminals. The communication resource controller 14 also includes a well known microprocessor radio-telephone interconnect (MRTI) terminal 16, which among other functions provides for interfacing of the telephone network 12 with the communication resource controller 14. The MRTI terminal 16 includes circuitry for the encoding and decoding of the DTMF signals, and a well known full duplex module for simultaneous communication between the telephone network 12 and the communication unit 18. A subscriber list 19, which may comprise a non-volatile memory, is coupled to the microcomputer 16, and stores the address code of all of the communication units 18 in the system 10. The microcomputer 16 determines the addressed communication unit 18, and initiates the call to the communication unit 18, after properly formatting an address message.

A person of ordinary skill in the art will appreciate that in a TDD system, a synchronized communication must be present between the communication resource controller 14 and communication unit 18. Accordingly, a synchronized communication is present between the communication resource controller 14 and the remote sites 11, and furthermore, synchronized communication is present between the remote sites 11 and the communication units 18. The microcomputer 13 provides the synchronization for the entire system by periodically transmitting a synchronization and other messages during an allocated transmission duration. Accordingly, a clock 15 provides the timing for the operation of the microcomputer 13. The communication unit 18 maintains synchronization with the communication resource controller 14 by detecting one of a number of valid digital synchronization words periodically transmitted by the communication resource controller 14. The communication units 18 receive the synchronization words during an allocated receive duration. If the communication units are previously synchronized, they maintain synchronization with the communication resource controller 14, and if unsynchronized, they acquire synchronization by examining the synchronization word.

The microcomputer 13 provides for the formatting of the messages communicated among the communication resource controller 14, the remote sites 11, and the communication units 18. The message format of the system 10 will be discussed in detail later. The microcomputer controls the remote sites 11, and enables them to simulcast common messages to all communication units 18, such as transmission of a communication unit address. Accordingly, the microcomputer 13, based on the transmitter steering signal, enables the remote site 11 providing highest response from the addressed communication unit 18 during the call process, and steers the audio from the telephone network 12 to that remote site. It should be noted that for ease of understanding, only the essential components of the communication resource controller 14 are shown. Other known microcomputer circuitry, such as ROM and RAM, are assumed to be included in the microcomputer 16 block shown on FIG. 2.

Figure 3:
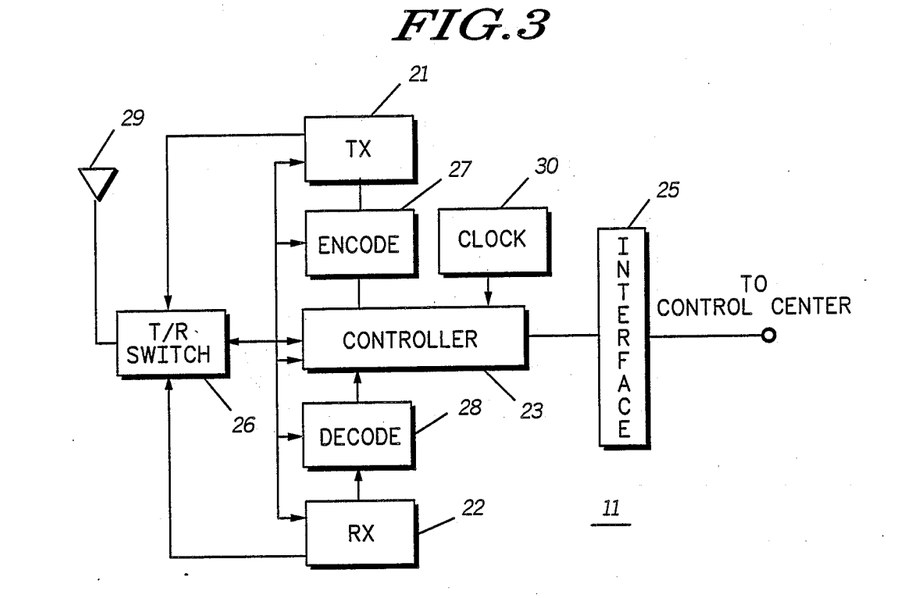
FIG. 3 is a block diagram of one of the remote sites of communication system of FIG. 1.

Referring to FIG. 3, the block diagram of a remote site 11 is shown. A controller 23 controls the major functions of the remote site 11. The remote site 11 includes a transmitter 21 and a receiver 22 for RF communication with the communication unit 18. An encoder module 27 is coupled to the controller 23, and provides for encoding of the transmitted signal. Accordingly, a decoder module 28 is coupled to the controller 23, and provides for decoding of the received signal. A switch interface module 25 under the control of the controller 23 interfaces the remote site 11 with the communication resource controller 14.

The remote site 11 periodically searches for synchronization messages from the communication resource controller 14. The synchronization messages are received and decoded by the remote sites 11, and provide for bit and frame synchronization of the remote site 11. The remote sites 11 after synchronization with the remote system transmit a message to the communication resource controller 14 and the voting means 17 to confirm bit and frame synchronization. In order to provide duplex communication, the remote site 11 transmit messages, via the transmitter 21, during a transmit time slot, and receive messages, via the receiver 22, during a receive time slot. A T/R switch couples the transmitter 21 and the receiver 22 to an antenna 29. The controller 23 controls the T/R switch such that the transmitter 21 and receiver 22 are connected to the antenna 29 during the appropriate time slots. The remote site 11 after synchronization with the communication resource controller 14 transmits the synchronization messages received from the communication resource controller 14 to the communication units 18.

Figures 4A, 4B, 4C:
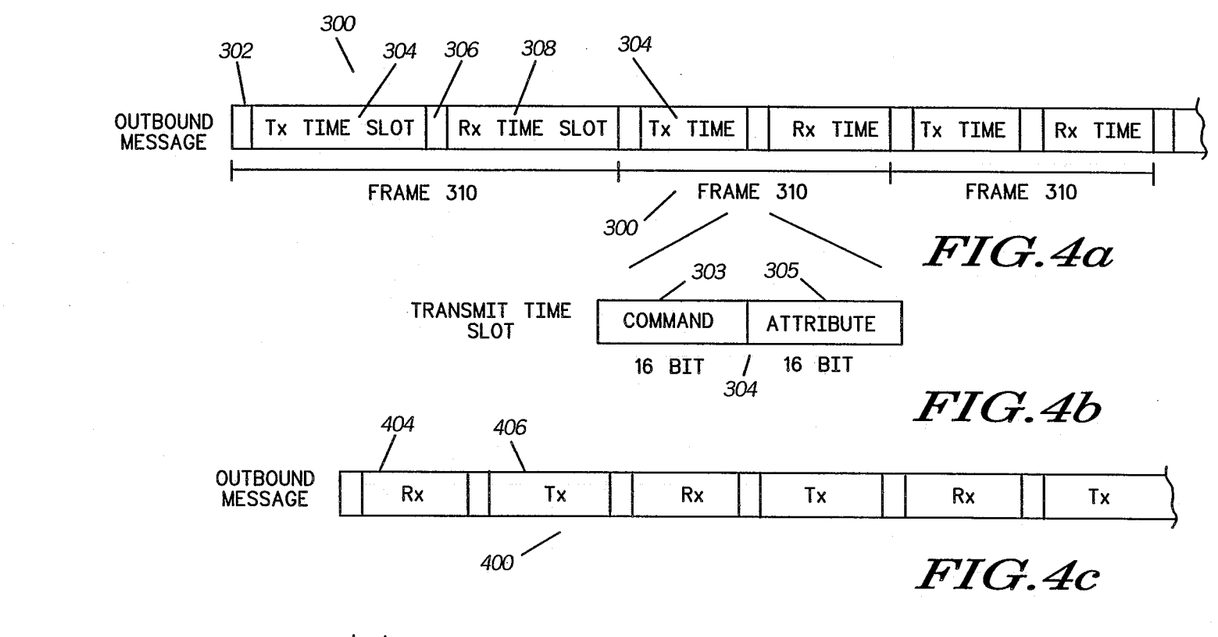
FIG. 4a is an illustration of an outbound message format used in the communication system of FIG. 1.
FIG. 4b is an illustration of the frame format used in the communication system of FIG. 1.
FIG. 4c is an illustration of the inbound message format used in the communication system of FIG. 1.

In the preferred embodiment of the invention. The messages communicated in the system 10 may assume an outbound format or an inbound format. An outbound message format is communicated from the communication resource controller 14 to the communication unit 18, and the inbound message format is communicated from the communication unit 18 to the communication resource controller 14. Referring to FIG. 4a, a preferred outbound message format 300 is shown. The message 300 is divided into repeated frames 310 having a frame duration, and may be communicating voice or digital data messages in that duration. In the preferred embodiment of the invention, digital data is communicated using any FSK modulation technique at 600 bit/sec data rate. Each frame 310, when carrying digital data, preferably comprises 70 bits. The frame 310 is divided into a first key time slot 302, a transmit time slot 304, a second transmitter key time slot 306, and a receive time slot 308. The first and second key time slots 304 and 306 are used to compensate for the time required to activate and deactivate the transmitters of remote site 11, and the communication unit 18. In the preferred embodiment of the invention, the key time slots 302 and 306 have a 5 ms duration, which corresponds to 3 bits in a digital message. The transmit time slot 304 is allocated for transmission of voice or digital data information to the communication unit 18, and receive time slot 308 is allocated for reception of voice or digital data information from the communication unit 18. In the preferred embodiment, the transmit time slot 304, and the receive time slot 308 each have a 53 ms duration, which corresponds to 32 bits when communicating digital data. Referring to FIG. 4b, the transmit time slot 304 when carrying digital data is divided into two 16 bit words: a command word 303 preceded by an attribute word 305. The command word 303 may be coded to indicate a status command or an address command. When the command word is coded to status command, the following attribute word 306 is coded to indicate a system busy or system free status. On the other hand, when the command word 303 is coded to an address command, it indicates that the following attribute word 305 is an address code for a particular communication unit 18. Referring to FIG. 4c, an inbound message format 400 similar to the message 300 of FIG. 4a is shown. On the inbound message, the digital data during transmit time slot 406 may comprise an inbound call request command word followed by the address of the telephone network 12 to which the inbound call is directed. Additionally, the communication unit 18 may transmit an acknowledgment, when a call addressed to it is received. Since the communication resource controller controls the synchronization and status of the entire system, an inbound message 400 does not have a status command format. Comparing FIG. 4a and 4c, it can be noted that the receive time slot 404 of the inbound message occurs during transmit time slot 304 of the outbound message 300, and vice versa.

Figure 4D:
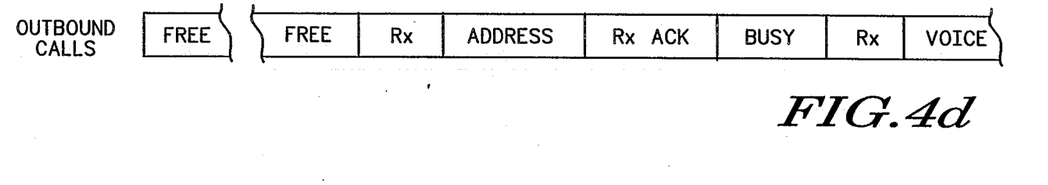
FIG. 4d is an illustration of the message activity during an outbound call.

Referring to FIG. 4d, the message activity during an out bound call is shown. When no call is initiated or requested, the communication resource controller 14 transmits, through the remote sites 11, repeated simulcast outbound messages having a status command and the system free attribute word. When an outbound call is about to initiated by the telephone network 12, the communication resource controller 14 transmits a simulcast out bound call request message indicating a address command word followed by attribute word indicating the address code of the communication unit to which the call is directed. As will be described later the address command and the address code attribute words are repeated until an acknowledgment is received from the communication unit 18 in response to the requested call. As will be described later, the address code is repeated for a finite number of times to insure the communication unit 18 did not miss the call. After receiving the acknowledgment, the communication resource controller 14 transmits a simulcast outbound message having a status command and a system free attribute word in order to inhibit the remaining communication units from initiating or requesting a call. Thereafter, voice information is communicated between the telephone network 12 and the communication unit 18. As will be appreciated by one of ordinary skill in the art, the message format that is used in the preferred embodiment of the present invention is not limited to any particular messaging format and may comprise one of the many formats available in the art.

Figure 5:
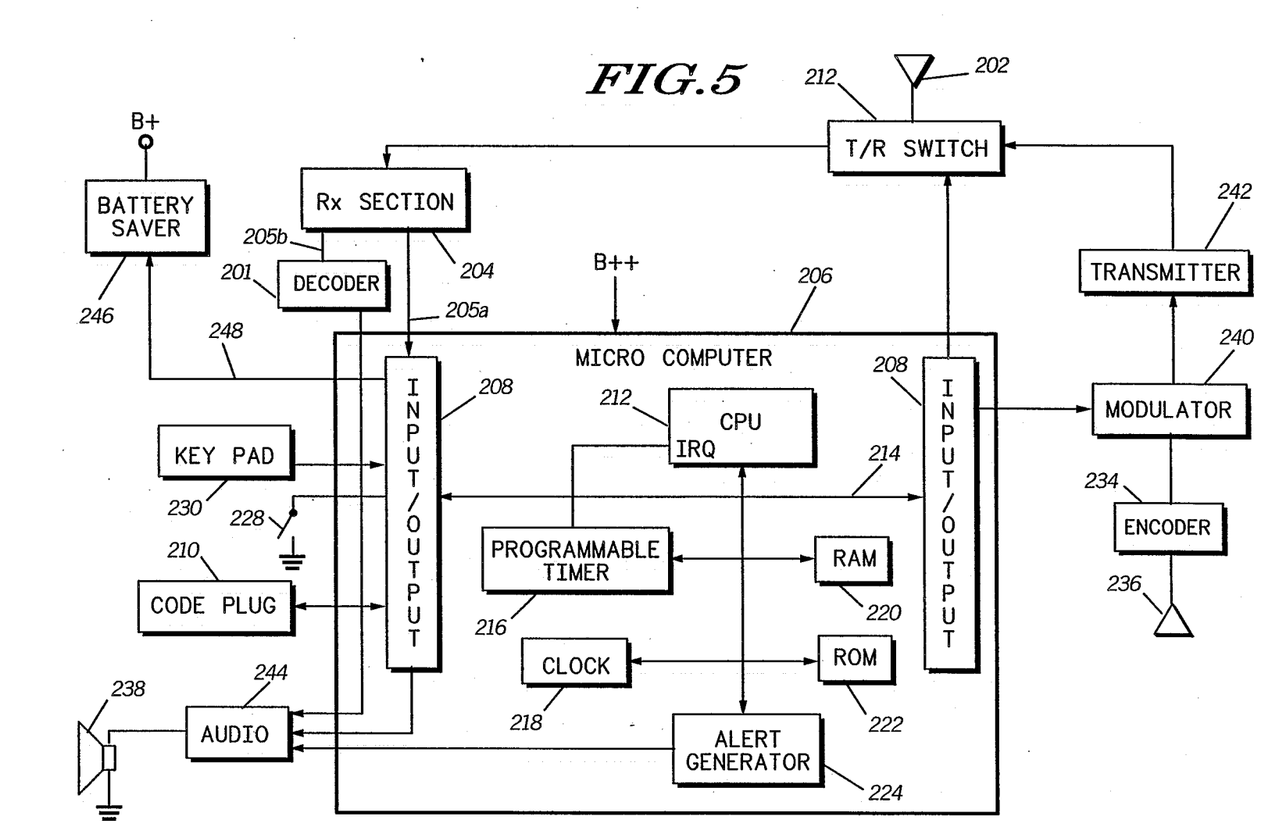
FIG. 5 is a block diagram of the communication unit used in the communication system of FIG. 1.

Referring to FIG. 5, the preferred embodiment for communication unit 18 utilizing a microcomputer 206 in its implementation is shown. The microcomputer 206 includes a CPU 212 for operational control of the communication unit 18. A clock 218 provides the reference timing for the CPU 212, and a programmable timer 216. The programmable timer 216 is used to generate timing intervals required for battery saver operation and generate audio tones, such as tones for alerting the user when a call is received. An internal bus 214 connects all the elements of the microcomputer 206 such as a RAM 220, and a ROM 222.

It is known by one of ordinary skill in the art that implementation of the operation of the communication unit 18 is a matter of programming the steps of the operation in any known programming language. The ROM 222 contains the firmware controlling the operation of microcomputer 206. The messages are transmitted or received by the communication unit through an antenna 202. The antenna may be coupled to a receiver 204 or a transmitter 242 through a T/R switch 212. The T/R switch, under the control of microcomputer 206, is coupled to the receiver 204 during the receive time slot, and coupled to the transmitter 242 during transmit time slot. The receiver 204 provides a digital output 205a, which is coupled to the microcomputer 206 through an I/O port interface 208 (shown split in the figure). The I/O port interface 208 provides communications to the circuits external to microcomputer 206. The receiver 204 also provides a signal 205b to the encoder 201, which couples analog signals, such as the voice message, to an audio circuit 210 for delivery to a speaker 238. It will be appreciated that, the operation of the encoder 201 is complementary to the operation of the encoder 27 of FIG. 3.

Figure 6:
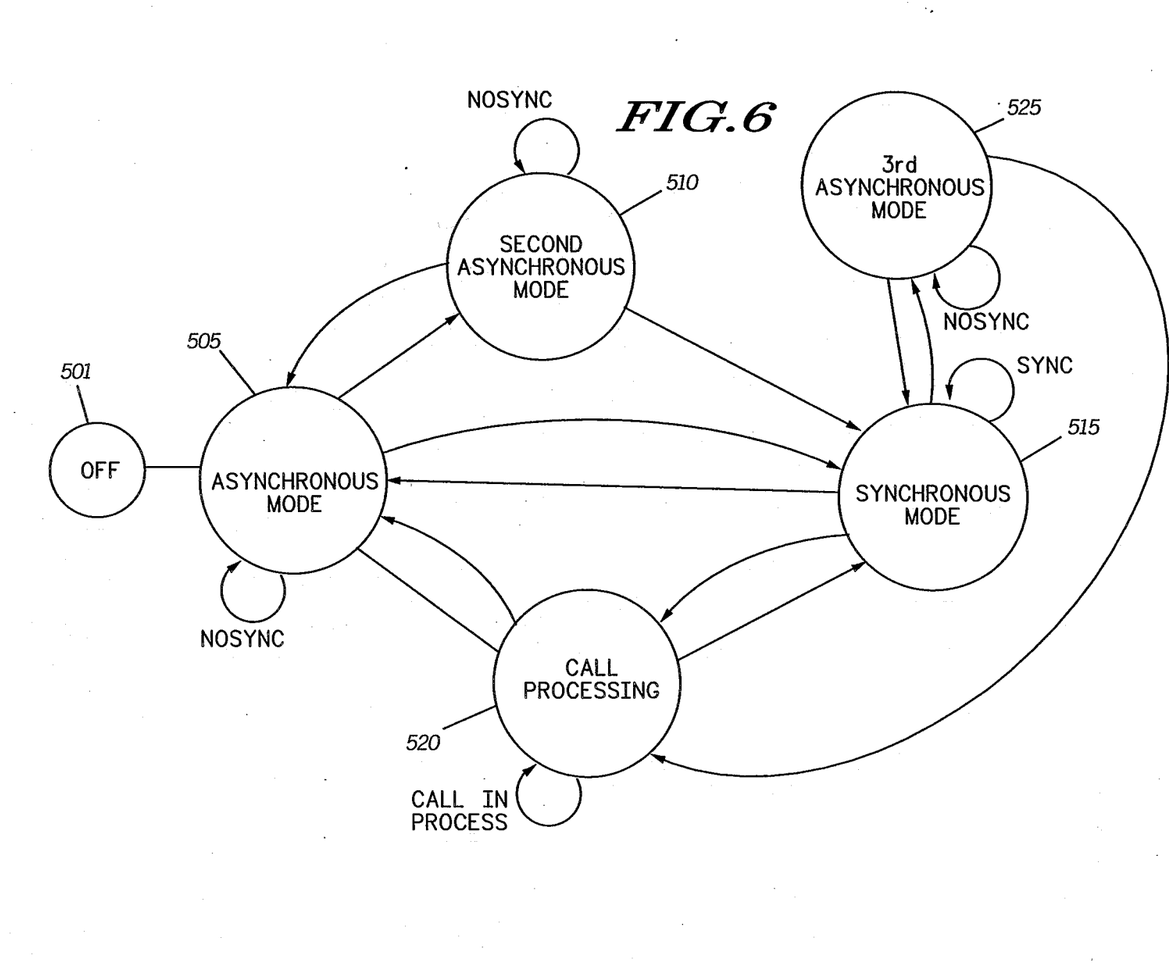
FIG. 6 is the operational state diagram of the communication unit which uses the battery saving method of the present invention.

Referring to FIG. 6, the operation of communication unit 18 in conjunction with FIG. 5 will be described. The communication unit, when initially powered, enters an asynchronous battery saving mode 505 from an OFF mode 501. In the asynchronous battery saving mode 505, the communication unit 18 attempts to acquire bit synchronization during a synchronization acquisition interval. The bit synchronization is acquired by performing correlation detection on a sufficient number of received bits. The microcomputer 206 examines the every 16 received bits for correlation with at least a valid command or attribute word in the communication units 18 receive time slot. In the preferred embodiment of the invention, the synchronization acquisition interval is set for a duration of 85 bits, which corresponds to 70 bits for duration of an entire frame and 15 bits for duration of the next command word. This synchronization acquisition interval insures bit synchronization at any instance, since normally during and 85 bit interval a valid synchronization word must be present. If a bit synchronization is not acquired within the synchronization acquisition interval, the communication unit 18 reduces power consumption for an asynchronous power saving interval. The asynchronous power saving interval is set to be equal to the duration of a number of message frames, such as 20 frames. In the asynchronous battery saving mode 505, the CPU 212 generates a save signal 248 on the I/O port interface 208. The save signal 248 is applied to a battery saver circuit 246, and the battery saver circuit 248 reduces power consumption of the communication unit 18. It is well known in the art that the battery saver circuit reduces the power consumption by cutting off the power connection to the major power consuming portion, such as the receiver 204, of the communication unit 18. Additionally, the CPU 212 programs the programmable timer 216 to a interval substantially equal to the asynchronous power saving interval, which in the preferred embodiment is selected to be the duration of 20 frames. After the asynchronous power saving interval has elapsed, the programmable counter 216 generates a interrupt request signal to reset the CPU 212. Upon reset, the CPU 212 removes the save signal 248 in order to fully power the communication unit, and thereafter, the asynchronous synchronization mode 505 will be repeated. However, if after a certain number of attempts a synchronization is not acquired, it may be assumed that the communication unit is either out-of-range or there has been an equipment malfunction in the system 10. Therefore, in order to save additional power, it may be desired to establish a time reference and vary the asynchronous power saving interval, as a function of elapsed time, in the asynchronous battery saving mode. In this case, the asynchronous power saving interval may be extended to a duration substantially longer than that of the previous asynchronous the power saving interval. Accordingly, in the preferred embodiment of the invention, after synchronization is not acquired after 30 attempts, the communication unit enters a second asynchronous battery saving mode 510, wherein the asynchronous power saving time interval is extended to a longer asynchronous power saving interval, preferably to 84 frames duration. A person of ordinary skill in the art will appreciate that, the communication unit 18 may enter any number of asynchronous battery saving modes, which have a variable asynchronous power saving interval.

If however, during synchronization acquisition interval of one of asynchronous battery saving modes a valid attribute word is detected, the communication unit 18 exits the asynchronous mode and enters a mode corresponding to the the detected attribute word. Upon detection of a system free or system busy attribute word the communication unit 18 enters a synchronous battery saving mode 515. In the synchronous battery mode the microcomputer 206 reduces power consumption by generating the save signal 248 and programming the programmable timer 216 for a synchronous power saving interval. Since the communication units are synchronized in the synchronous mode, they merely refine bit synchronization and verify frame synchronization during a synchronization verification interval. The synchronization verification interval examines the attribute word and if the system free attribute word is detected the system remains in the synchronous battery saving mode. If a system busy attribute word is detected the communication unit 18 remains in the asynchronous battery saving mode, after setting a flag to indicate that a call request is in process, and another communication unit 18 is about to initiate a call. If neither a system busy nor a system free attribute word is detected, the communication unit remains in the active mode, and the microcomputer 216 examines the command word of the next receive time slot. If a status command is detected, and if free or busy attribute words are detected, the communication unit remains in the synchronous mode. If neither a busy or a free attribute word is detected, the communication unit 18 assumes a system fading has occurred and remains in the synchronous battery saving mode. In the synchronous battery saver mode 515, a loss of synchronization returns the communication unit 18 to the asynchronous mode 505.

If an address command is detected, the communication unit decodes the address of the attribute word. The microcomputer 206 determines the predetermined address of the communication unit 18 from a code plug 210. If the communication unit 18 decodes one of its own addresses it enters a call process mode 520, wherein after acknowledging the call request, voice messages are communicated between the controller 14 and the communication unit 18. In the beginning of the call processing mode 520, an alert signal is generated by an alert generator 224, which is coupled to audio circuit 244 for delivery to the speaker 238. In the call processing mode, voice messages are communicated during the transmit and receive time slots. The communication unit 18 involved in the call process uses a known method of maintaining synchronization by detecting an embedded synchronization signal in the received voice message. During a call process, only the communication unit 18 involved in the call will remain synchronized and the remaining communication units lose synchronization. If the address of the communication unit 18 is not detected, or if the command word of the next slot is not valid, the communication unit 18 assumes that a call to another unit is requested and a call about to begin or is in process, and enters a third asynchronous battery saving mode 525 having a third asynchronous power saving interval. Again, the third power saving interval may be the duration of any number of frames. Accordingly, the communication unit 18 may enter the call process 520 from any of the asynchronous battery saving modes, upon decoding the address to which it responds. Additionally, the communication unit 18 may enter the asynchronous power saving mode 505, when synchronization is lost.

Once the communication unit 18 is synchronized, the transmitter 242 is enabled, and a call may be initiated by the communication unit 18. The transmitter 242 may be enabled as soon as the comunication unit 18 is synchronized, however, this may cause increased power consumption since continuous power must be supplied to the transmitter. Therefore, it may be advantageous to enable the transmitter in response to an indication that a transmission by the communication unit 18 is needed. Activation of a switch 228 may be detected to indicate that a transmission is intended by the user of the communication unit 18. The switch 228 may be activated by raising the antenna, or opening the cover of the communication unit 18. A call may be initiated by entering an access code through a key pad/display interface 230. The access code and the telephone number are processed by the microcomputer 206 in order to produce an inbound call request and a telephone address code. These codes are applied to a well known modulator 240 for transmission to the remote sites 11 and the communication resource controller 14 through the transmitter 242. In response to an inbound call request, the communication resource controller 14 transmits a simulcast status command followed by a system busy attribute word. Once the connection is established between the communication unit 18 and the telephone network 12 voice messages may be communicated. The voice signals generated by a microphone 236 are coupled to a decoder 238 output of which is coupled to the modulator 240. It will be appreciated that, the operation of the decoder 238 is complementary to the operation of the decoder 28 of FIG. 3.

According to the battery saving method of the invention, the power consumption of the remote units is reduced for a period of time based on a predetermined criteria, which justifies such power reduction. For example, in the description of system 100 one such criteria has been based upon the duration of the elapsed time from the reference in which the time reference is the start of asynchronous battery saving mode. The communication unit 18, when in asynchronous power saving mode may fail to detect a call during the asynchronous power saving interval before which it acquires synchronization. However, the risk of losing such a call is low enough that it justifies using the power saving method of the present invention. Therefore, it may be desirable to base power saving criteria on additional factors providing such a low risk, namely, estimation of system utilization. The system utilization may be estimated by the number of times, in which a call is directed to a communication unit 18 during a predetermined interval, such as one hour. Particularly, in the synchronous battery saving mode, it may be desirable to extend the synchronous power saving interval, based on the estimation of system utilization. Based on such estimation the power consumption may be reduced for a predetermined synchronous power saving interval. A person of ordinary skill in the art will appreciate that, estimating sysstem utilization is simply a matter of providing the necessary programs in the firmware of the communication unit 18. It will also be appreciated that, the communication unit 18 will remain synchronized after such synchronous power saving interval, if the synchronous power saving interval is the duration of a predetermined number of frames.

In the synchronous power saving mode, in order to insure a communication unit will have a sufficient chance of detecting a call directed to its address, the communication resource controller 14 must repeat transmission of the address transmit time slot for a sufficient number of times. Accordingly, in the preferred embodiment of the invention the address frame is repeated 21 times, since the synchronous power saving interval is the duration of 20 frames. Additionally, on a lightly loaded system, it may be desired to introduce idle periods between the transmission of the synchronization messages in order to extend the life of the remote site transmitters 21. Accordingly, it will be necessary to repeat the portable address frames at least one time more than the the number of frames comprising the duration of the longest asynchronous battery saving interval. Similarly, to allow communication units 18 that are waiting for a channel free frame an opportunity to access the system, the channel free frame would have to be sent for a sufficient number of frames to guarantee that any waiting communication unit 18 can acquire synchronization.

What is claimed is:

1. In a time division multiplexed communication system capable of synchronously communicating message signals between a communication resource controller and at least one remote communication unit having a means for reducing power consumption; a method for reducing power consumption in said communication unit, comprising the steps of:
   (a) attempting to acquire synchronization during a synchronization acquisition interval;
   (b) entering an asynchronous battery saving mode, when synchronization is not acquired, including the step of:
      (i) reducing power consumption for a variable asynchronous power saving interval;
   (c) entering a synchronous power saving mode when synchronization is acquired including the steps of:

(i) detecting a call request between said communication resource controller and said communication unit,
(ii) reducing power consumption for a synchronous power saving interval when said call request is not detected,
(iii) verifying synchronization presence during a synchronization verification interval;
(d) entering said asynchronous battery saving mode when synchronization is lost.

2. The method of claim 1, wherein said step of attempting to acquire synchronization during said synchronization acquisition interval is substantially longer than said synchronization verification interval.

3. The method of claim 1, wherein said step (b) further comprises the steps of:
(ii) determining elapsed time with reference to a established time reference within said asynchronous battery saving mode,
(iii) extending said asynchronous power saving interval as a function of said elapsed time in said asynchronous battery saving mode.

4. The method of claim 3, wherein said step (b)(ii) further comprises:
(ii) determining elapsed time with reference to a established time reference within said asynchronous battery saving mode, wherein said established time reference comprises start of said asynchronous battery saving mode.

5. The method of claim 1, further comprising the step of:
(e) entering said asynchronous battery saving mode when said call request results in communication between said communication resource controller and another communication unit.

6. The method of claim 5, wherein said step (e) comprises the step of:
varying said asynchronous power saving interval to a substantially longer interval than said synchronous power saving interval.

7. The method of claim 1, wherein said step (c)(ii) comprises reducing power consumption for a variable synchronous power saving interval.

8. The method of claim 7, wherein said step (c) further comprises the steps of:
(iv) estimating system utilization from said message signals,
(v) varying said synchronous power saving interval as of function of estimated system utilization.

9. In a time division multiplexed communication system capable of synchronously communicating message signals between a communication resource controller and at least one remote communication unit having a means for reducing power consumption; a method for saving power consumption in said communication unit, comprising the steps of:
(a) verifying synchronization presence during a synchronization verification interval;
(b) entering a synchronous battery saving mode, when synchronization presence is verified, comprising the steps of:
(i) detecting a call request between said communication resource controller and said communication unit,
(ii) reducing power comsumption for a synchronous power saving interval when said call request is not detected;
(c) entering an asynchronous battery saving mode, when synchronization presence is not verified, comprising the steps of:
(i) reducing power consumption for a variable asynchronous power saving interval,
(ii) attempting to acquire synchronization during a synchronization acquisition interval;
(d) entering said asynchronous battery saving mode when synchronization is lost.

10. The method of claim 9, wherein said step of attempting to acquire synchronization during said synchronization acquisition interval is substantially longer than said synchronization verification interval.

11. The method of claim 9, wherein said step (c) further comprises the steps of:
(ii) determining elasped time with reference to a established time reference within said asynchronous battery saving mode,
(iii) extending said asynchronous power saving interval as a fuction of said elapsed time in said asynchronous battery saving mode.

12. The method of claim 11, wherein said step (c)(ii) further comprises:
(ii) determining elapsed time with reference to a established time reference within said asynchronous battery saving mode, wherein said established time reference comprises start of said asynchronous battery saving mode.

13. The method of claim 9, further comprising:
(e) entering said asynchronous battery saving mode when said call request results in communication between said communication resource controller and another communication unit.

14. The method of claim 13, wherein said step (e) further comprises:
(e)(i) varying said asynchronous power saving interval to a substantially longer interval than said synchronous power saving interval.

15. The method of claim 9, wherein said step (b)(ii) comprises reducing power consumption for a variable synchronous power saving interval.

16. The method of claim 15, wherein said step (b) further comprises the steps of:
(iv) estimating system utilization from said message signals,
(v) varying said synchronous power saving interval as of function of estimated system utilization.

17. In a time division multiplexed communication system capable of synchronously communicating message signals between a communication resource controller and at least one remote communication unit, said communicating unit comprising:
a controller means for controlling the operation of said communication unit,
a verification means for verifying synchronization presence,
an acquisition means for acquiring synchronization;
a power reduction means for reducing power consumption when enabled by said controller;
said controller enabling said power reduction means for a synchronous power saving interval, when synchronization is verified during a variable synchronization verification interval, said controller means enabling said power reduction means for a first variable asynchronous power saving interval, when synchronization is not acquired during a synchronization acquisition interval.

18. The communication unit of claim 17, wherein said first asynchronous power saving interval is substantially longer than said synchronous power saving interval.

19. The communication unit of claim 17, further comprising:
   a detector means for detecting a call initiation between said communication resource controller and another communication unit, said controller means reducing power consumption for a second asynchronous power saving interval, when a call to another communication unit is detected.

20. The communication unit of claim 19, wherein said second asynchronous power saving interval is substantially longer than said synchronous power saving interval.

21. In a time division multiplexed communication system capable of synchronously communicating message signals between a communication resource controller and at least one remote communication unit having a means for reducing power consumption, a method for reducing power consumption in said communication unit, comprising the steps of:
   (a) attempting to acquire synchronization during a synchronization acquisition interval,
   (b) entering an asynchronous battery saving mode, when synchronization is not acquired, including the steps of:
      (i) determining elapsed time with reference to a established time reference within said asynchronous battery saving mode,
      (ii) reducing power consumption for an asynchronous power saving interval, wherein said varible asynchronous power saving being a function of said elapsed time in said asynchronous battery saving mode.
   (c) entering a synchronous power saving mode when synchronization is acquired including the steps of:
      (i) estimating system utilization from said message signals,
      (ii) reducing power consumption for a synchronous power saving interval, said variable power saving interval being a of function of estimated system utilization.

22. The method of claim 21 further comprising the step of:
   (d) entering said asynchronous battery saving mode when synchronization is lost.

23. The method of claim 21, wherein said step (b)(i) further comprises:
   (i) determining elapsed time with reference to a established time reference within said asynchronous battery saving mode, wherein said established time reference comprises start of said asynchronous battery saving mode.

* * * * *